(12) United States Patent
Kim

(10) Patent No.: US 8,210,771 B1
(45) Date of Patent: Jul. 3, 2012

(54) IMPERVIOUS MEMBRANE SYSTEM FOR EVAPORATION PREVENTION ON OPEN WATER CONVEYANCE STRUCTURES

(76) Inventor: Sun Yong Kim, Hayward, CA (US)

( * ) Notice: Subject to any disclaimer, the term of this patent is extended or adjusted under 35 U.S.C. 154(b) by 0 days.

(21) Appl. No.: 12/928,098

(22) Filed: Dec. 3, 2010

(51) Int. Cl.
*E02B 15/06* (2006.01)
(52) U.S. Cl. .......................................... 405/52
(58) Field of Classification Search ............ 422/43; 4/498; 220/216, 218; 126/565, 566; 405/52, 405/53, 63, 118
See application file for complete search history.

(56) References Cited

U.S. PATENT DOCUMENTS

| | | | | |
|---|---|---|---|---|
| 3,070,419 A | * | 12/1962 | Malick | 422/43 |
| 4,222,366 A | * | 9/1980 | Acker | 126/565 |
| 4,678,368 A | | 7/1987 | Helversen | |
| 6,385,791 B1 | * | 5/2002 | Bussey et al. | 4/498 |

* cited by examiner

*Primary Examiner* — Sunil Singh
(74) *Attorney, Agent, or Firm* — Richard Esty Peterson

(57) ABSTRACT

A system for reducing evaporation of slow moving water in a water conveyance structure, such as an aqueduct or canal, which includes a series of floating membrane sheets, where each sheet has a leading edge attached to a cable anchored at each end to the water conveyance structure across the water and a trailing edge that underlies the leading edge of the adjacent sheet and that floats on the surface of the water, with the membrane sheets carrying a solar energy system for the production of electrical energy.

18 Claims, 2 Drawing Sheets

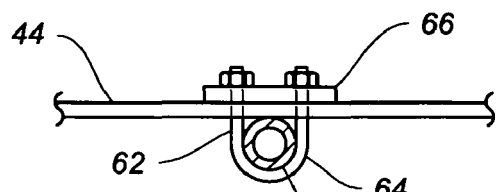
FIG. 4
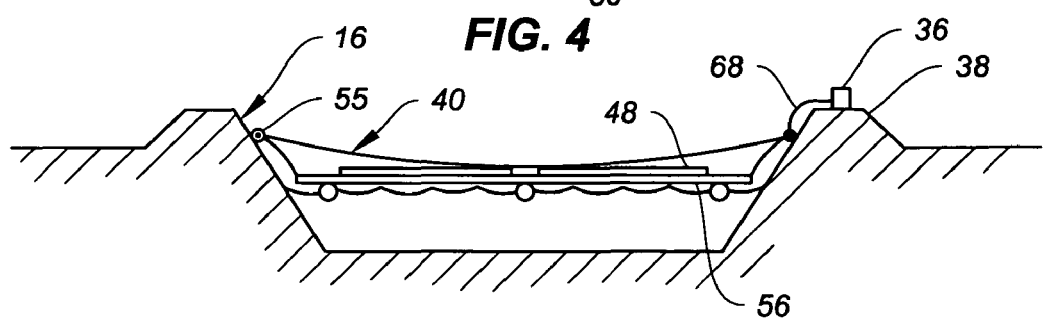
FIG. 5
FIG. 6

IMPERVIOUS MEMBRANE SYSTEM FOR EVAPORATION PREVENTION ON OPEN WATER CONVEYANCE STRUCTURES

BACKGROUND OF THE INVENTION

This invention relates to a system for reducing evaporation of slow moving water in an open water conveyance structure, such as an aqueduct or canal. The preferred system comprises an impervious membrane in a series of sheets that float on the surface of the water. The sheets of the floating membrane system have a lead edge that is connected to a cable that is anchored to the wall of the water structure and a trailing edge connected to a buoyant boom that extends across the water structure to spread the sheet over the flowing water.

The transport of water utilizing canals and aqueducts has been accomplished for thousands of years. Furthermore, covering the water structure has also been done to prevent contamination from debris and loss of water from evaporation. Conventionally, the canal or aqueduct has been covered by a structure that is raised above the water surface and is thereby limited by the dimension of the span. For large water conveyance structures with a wide span, the cost of any covering elevated above the water surface is typically greater than any potential savings from inhibiting water loss. In order to be cost effective, the covering for a modern, concrete water conveyance structure must be inexpensive and durable.

SUMMARY OF THE INVENTION

The modern aqueduct can be an open waterway for conveyance of large volumes of water across great distances through arid regions. Evaporation from sun and wind can result in substantial losses in the volume of delivered water, costing millions of dollars. With spans exceeding a hundred feet and lengths in hundreds of miles, the cost of an elevated covering is prohibitive.

The floating membrane system of this invention provides an inexpensive and expedient solution for reducing water loss in an open water conveyance structure, such as an canal or open aqueduct.

The membrane system comprises a series of floating membrane sheets that span the width of the conveyance structure and are substantially rectangular in configuration with a leading edge and a trailing edge. The leading or "upstream" edge is connected to a cable and spans the water conveyance structure that typically has vertical or sloping walls. The cable is connected to opposite walls of the conveyance structure by anchors embedded into the concrete of the walls. The trailing or downstream edge is connected to a buoyant boom, such as a capped plastic pipe. The membrane is fabricated of a durable vapor impervious material that is preferably self-floating to prevent surface evaporation of the conveyed water. The exposed surface of the membrane is optionally reflective to reduce surface water temperatures and may, when costs allow, be coated with a solar energy layer that feeds power into the cross cable for collection at the anchor or anchors.

The series of rectangular sheets are interleaved with the lead cable-connected edge elevated above and over the trailing boom-connected edge.

BRIEF DESCRIPTION OF THE DRAWINGS

FIG. 4 is an enlarged, cross-sectional view of a typical U-tie for connecting the buoyant float structures to the sheets of the membrane system.

FIG. 5 is a transverse cross-sectional view of the aqueduct and a modified membrane system having a reinforced float structure for a flexible solar panel system.

FIG. 6 is a plan view of a segment of a conventional aqueduct with the modified membrane system of this invention installed with the supporting float structure.

DETAILED DESCRIPTION OF THE PREFERRED EMBODIMENTS

Figure 1:
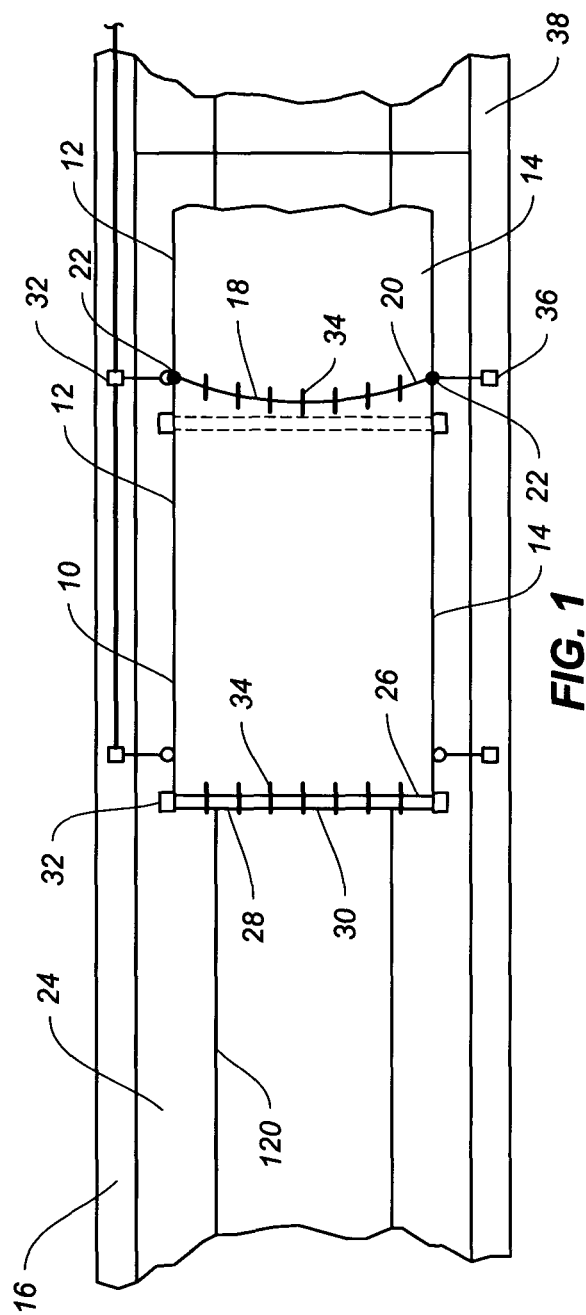
FIG. 1 is a plan view of a segment of a conventional aqueduct with the membrane system of this invention installed with layered sheets.

Referring to FIG. 1, the evaporation preventing membrane system 10 of this invention is shown with a series of impervious membrane segments 12 in the form of interleaved sheets 14 installed on a conventional water conveyance structure 16. It is to be understood that the sheets 14 are preferably installed along most of the length of the water conveyance structure 16, such as an aqueduct. The sheets 14 are substantially rectangular with an arcuate lead edge 18 to accommodate the arcuate course of a connected cable 20. The cable 20 is connected at each end to anchors 22, such as heavy eye-bolts, embedded in the sloping side walls 24 of the aqueduct 16. The sheets 14 may be altered in configuration, or omitted, where curved sections of the aqueduct cannot maintain the placement of the floating membrane segments 12.

The downstream or trailing edge 26 of the sheets 14 are connected to a buoyant boom 28, which here comprises a floating four-inch plastic pipe 30 with end caps 32.

Figure 3:
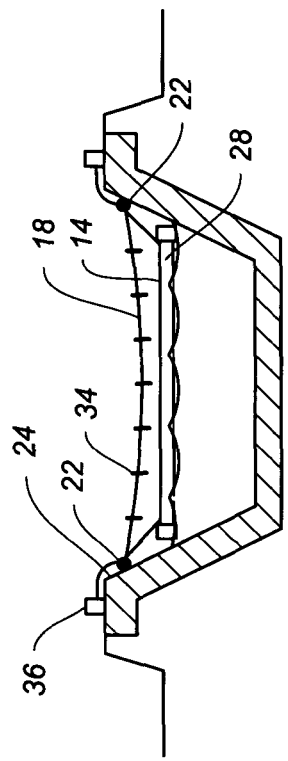
FIG. 3 is a transverse cross-sectional view of the aqueduct and membrane system of FIG. 1.
Figure 2:
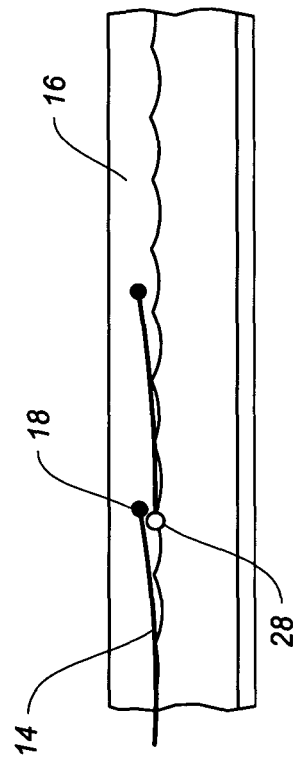
FIG. 2 is a longitudinal cross-sectional view of the aqueduct and membrane system of FIG. 1.

As shown in the cross-sectional view 6 of FIGS. 2 and 3, the leading or upstream edge 18 of the vapor impervious sheets 14 is elevated above and over the trailing or downstream edge 26, such that the sheets are interleaved and substantially cover the slow flowing water. The degree of overlap is in part determined by the expected changes in the level of the flowing water The membrane segments 12 preferably are fabricated of a durable material that floats on the surface of the water. The segments 12 may be hemmed at the leading or trailing edge to accommodate the cable 20 and boom 28, or are equipped with ties 34 for convenient replacement.

The membrane segments 12 forming the sheets 14 preferably have a layer of light-colored or reflective material on the exposed surface to reduce solar heat absorption and thereby further reduce evaporation of the water surface. As costs for flexible film solar collectors drop with the adaptation of printing techniques to rolled sheet materials, the sheets can have an energy collection surface that feeds modified cables with electric power that is collected at junction boxes 36 along the embankment 38 of the aqueduct 16.

Since the design of the impervious membrane system is relatively simple and is formed with membrane segments, different materials can be tried simultaneously to determine cost performance analytics over a relatively long period of time. For example, the impervious membrane segments may be fabricated of a bubble-wrap type of material with a laminated top reflective surface. A vinyl top laminate may be used to allow a solar collector circuit to be directly printed to the laminate.

Alternately, where a thin film solar collector is added to the membrane sheets and added buoyancy is required, the modified system of FIGS. 4-6 may be utilized.

Referring to FIGS. 4-6, the modified system, designated generally by the reference numeral 40, is installed on the water conveyance structure 16, with membrane segments 42 in the form of interleaved sheets 44 having a floatation structure 46 to aid in the support of a flexible solar panel system 48 on the top surface of the sheets 44.

In order to accommodate the added drag on a stainless steel cross cable 50, the ties comprise stainless steel rings 52 fixed to the cable 50 and engaging eyelets 53 in the reinforced edge 54 of the membrane segments 42. The cross cable 50 is connected at each end to an eyebolt anchor 55. In addition to a buoyant boom 56 proximate the trailing edge of the sheet, the floatation structure 46 includes additional cross booms 58, and to accommodate the solar panel system 48, a plurality of longitudinal float members 60. The cross booms 58 and longitudinal float members 60 can be interconnected by stainless steel U-ties 62 of the type shown in FIG. 4. The U-ties 62 have a U-bolt 64 and a cross plate 66, which in addition to interconnecting the float members and cross booms, can also be employed when appropriately sized to connect the cross booms to the sheets 44 forming the membrane segments 42, as illustrated in FIG. 4. The floatation structure 46 provides a framework for support of a flexible film solar collector that may not be suitable for the basic system of FIGS. 1-3.

With the modified system, the cross booms 58 may comprise 2 inch diameter sealed plastic pipe and the float members can comprise 4 inch diameter sealed plastic pipe. Wiring 68 for the flexible solar panel system 48 can wrap around the stainless steel cable 50 and connect to a junction box 36 along the embankment 38 of the aqueduct 16 as previously described.

Wherein the foregoing embodiments of the present invention have been set forth in considerable detail for the purposes of making a complete disclosure of the invention, it may be a changes may be made in such detail without departing from the spirit and principles of the invention.

The invention claimed is:

1. In an open aqueduct system having an elongated water conveyance structure with opposite, spaced walls that contain water between the walls wherein water is conveyed in the water conveyance structure, the improvement comprising:
   a membrane system for reducing evaporation of water in the elongated water conveyance structure, the membrane system having:
      a plurality of floating membrane segments covering the water in a part of the water conveyance structure, the membrane segments being fabricated of a durable vapor impervious material in the form of sheets having an upstream leading edge and a downstream trailing edge;
      a cable connected to the leading edge of each of the sheets forming the membrane segments, the cable for each sheet having ends and a length sized to span the space between the walls of the water conveyance structure; and,
      an anchor connected to each end of each cable with the anchor at one end of the cable fastened to one of the opposite walls of the water conveyance structure and the anchor at the other end fastened to the other of the opposite walls of the water conveyance structure with the cable spanning the space between the opposite walls,
      wherein the sheets of the plurality of floating membrane segments are arranged along the elongated water conveyance structure with the lead edge of one sheet overlapping the trailing edge of the adjacent sheet, such that the sheets are interleaved and substantially cover the water in the part of the water conveyance structure on which the membrane system is installed, and wherein the sheets of the membrane segments are fabricated with an electric energy collection surface that collects and feeds electrical power to electrical energy collectors.

2. In the open aqueduct system of claim 1 wherein the opposite spaced walls of the water conveyance structure include a sloping portion and a flat upper embankment portion, and wherein the improvement of the membrane system has the anchors for the cables of the sheets forming the membrane segments fastened to the sloping portion of the opposite spaced walls.

3. In the open aqueduct system of claim 2, the improvement of the membrane system wherein the sheets of the membrane segments are fabricated of a material that floats on the water.

4. In the open aqueduct system of claim 1, the improvement of the membrane system comprising further:
   a buoyant boom connected along the downstream trailing edge of each of the sheets of the membrane segments, wherein the buoyant boom aids in spreading the sheets across the water and floating the sheets on the surface of the water.

5. In the open aqueduct system of claim 4, the improvement of the membrane system wherein the system further includes an added floatation structure on each membrane segment with additional cross booms spaced from the buoyant boom at the trailing edge of the sheets of the membrane segments and a plurality of longitudinal float members transverse to and interconnected with the cross booms, the membrane segments having electric energy collection surfaces in the form of solar collectors connected to the top of the sheets of the membrane segments.

6. In the open aqueduct system of claim 1, the improvement of the membrane system wherein the sheets of the membrane segments are fabricated of a laminate material with an upper surface layer having electric energy collection properties.

7. In the open aqueduct system of claim 1, the improvement of the membrane system wherein the energy collection surface comprises flexible film solar collectors.

8. In the open aqueduct system of claim 1, the improvement of the membrane system wherein the sheets of the membrane segments are fabricated of a material having a surface that is printed with an energy collection surface.

9. In the open aqueduct system of claim 1, the improvement of the membrane system wherein the electrical energy collectors each include an electrical junction box electrically connected to the energy collection surface of the sheets of the membrane segments to extract electrical energy from the membrane segments for transmission.

10. In an open aqueduct system having an elongated water conveyance structure with opposite, spaced walls that contain water between the walls wherein water is conveyed in the water conveyance structure, the improvement comprising:
   a membrane system for reducing evaporation of water in the elongated water conveyance structure, the membrane system having:
      a plurality of floating membrane segments covering the water in a part of the water conveyance structure, the membrane segments being fabricated of a durable vapor impervious material in the form of sheets having an upstream leading edge and a downstream trailing edge;
      a cable connected to the leading edge of each of the sheets forming the membrane segments, the cable for each sheet having ends and a length sized to span the space between the walls of the water conveyance structure;

an anchor connected to each end of each cable with the anchor at one end of the cable fastened to one of the opposite walls of the water conveyance structure and the anchor at the other end fastened to the other of the opposite walls of the water conveyance structure with the cable spanning the space between the opposite walls; and, a buoyant boom connected along the downstream trailing edge of each of the sheets of the membrane segments, wherein the buoyant boom aids in spreading the sheets across the water and floating the sheets on the surface of the water, wherein the sheets of the plurality of floating membrane segments are arranged along the elongated water conveyance structure with the lead edge of one sheet overlapping the trailing edge of the adjacent sheet, such that the sheets are interleaved and substantially cover the water in the part of the water conveyance structure on which the membrane system is installed.

11. In the open aqueduct system of claim 10 wherein the opposite spaced walls of the water conveyance structure include a sloping portion and a flat upper embankment portion, and wherein the improvement of the membrane system has the anchors for the cables of the sheets forming the membrane segments fastened to the sloping portion of the opposite spaced walls.

12. In the open aqueduct system of claim 11, the improvement of the membrane system wherein the sheets of the membrane segments are fabricated of a material that floats on the water.

13. In the open aqueduct system of claim 12, the improvement of the membrane system wherein the sheets of the membrane segments are fabricated of a laminate material with an upper light reflective surface layer.

14. In the open aqueduct system of claim 10, the improvement of the membrane system wherein the sheets of the membrane segments are fabricated with an electric energy collection surface.

15. In the open aqueduct system of claim 14, the improvement of the membrane system wherein the electric energy collection surface comprises flexible film solar collectors.

16. In the open aqueduct system of claim 14, the improvement of the membrane system wherein the sheets of the membrane segments are fabricated of a material having a surface that is printed with an energy collection surface.

17. In the open aqueduct system of claim 14, the improvement of the membrane system wherein the system further includes an electrical junction box electrically connected to the electric energy collection surface of the sheets of the membrane segments to extract electrical energy from the membrane segments for transmission.

18. In the open aqueduct system of claim 10, the improvement of the membrane system wherein the system further includes an added floatation structure on each membrane segment with additional cross booms spaced from the buoyant boom at the trailing edge of the sheets of the membrane segments and a plurality of longitudinal float members transverse to and interconnected with the cross booms, the membrane segments having solar collectors connected to the top of the sheets of the membrane segments.

* * * * *